United States Patent [19]
Nojiri

[11] 3,751,579
[45] Aug. 7, 1973

[54] ELECTRICAL WIRING BUSHING WITH STRAIN RELIEF

[75] Inventor: Howard H. Nojiri, Bloomington, Minn.

[73] Assignee: Honeywell Inc., Minneapolis, Minn.

[22] Filed: Feb. 4, 1972

[21] Appl. No.: 223,630

[52] U.S. Cl............... 174/153 G, 174/65 G, 248/56
[51] Int. Cl.......................... F16l 5/00, H01b 17/26
[58] Field of Search............. 174/65 G, 135, 152 G, 174/153 G; 16/2; 248/56; 339/103 B, 105, 107

[56] References Cited
UNITED STATES PATENTS

| 3,103,399 | 9/1963 | Martin | 339/105 X |
| 3,249,687 | 5/1966 | Klumpp, Jr. | 174/153 G |
| 3,285,551 | 11/1966 | Tschanz | 248/56 |
| 3,493,205 | 2/1970 | Bromberg | 174/153 G X |

FOREIGN PATENTS OR APPLICATIONS

| 216,606 | 8/1961 | Austria | 174/153 G |

Primary Examiner—Laramie E. Askin
Attorney—Lamont B. Koontz and Clyde C. Blinn

[57] ABSTRACT

A bushing to protect and retain an electrical wire passing through an aperture in the side of an electrical box. The bushing is constructed to have a slot running parallel to its axis and a gate-like retaining means which is received crosswise of the slot to hold the wire in place. The bushing is especially adapted for use with an electrical box having an open slot in the aperture so that the bushing can be placed into the aperture and after it is in position, the electric wire or wires can be fed through the slot in the aperture and the bushing before the retaining means is placed in position. The bushing is made of a first portion which is received in the aperture of the box and a second portion containing the retaining means which are partially connected so that after the bushing is in place, the second portion can be deformed with a tool to allow removal of the retaining means.

12 Claims, 5 Drawing Figures

PATENTED AUG 7 1973  3,751,579

EXPANSION TOOL 36

ELECTRICAL WIRING BUSHING WITH STRAIN RELIEF

BACKGROUND AND SUMMARY OF THE INVENTION

Electrical bushings having strain relief features to protect and retain an electrical wire passing through an aperture or hole in the side of an electrical box are old and the art is highly developed. One particular bushing with strain relief is disclosed in the Menashe Bromberg U.S. Pat. No. 3,493,205. The Bromberg bushing can be placed into the hole in the side of an electrical box and after an electric wire is fed through the hole in the bushing and the hole in the electrical box, a plug member is placed in position to retain the wire for strain relief.

The present invention provides an improved bushing which is primarily a labor saving device to reduce the costs of electric equipment which is wired by passing wires into an electrical box to be connected to various contained equipment.

Specifically, the present invention is a bushing with a slot running parallel to its axis through the first and second portions of the bushing whereby an electrical wire can be placed into the bushing through the slot before a retaining means is used to hold the wire in the bushing. The bushing is especially adaptable for use with electrical boxes wherein the aperture or hole has a cooperating slot so that the bushing can be placed into the aperture of the electrical box; thereafter, the wire can be passed through the slot in the electrical box as well as the slot in the bushing before the retaining means is placed in place.

The invention is disclosed in the drawing of which:

DESCRIPTION OF THE INVENTION

Figure 1:
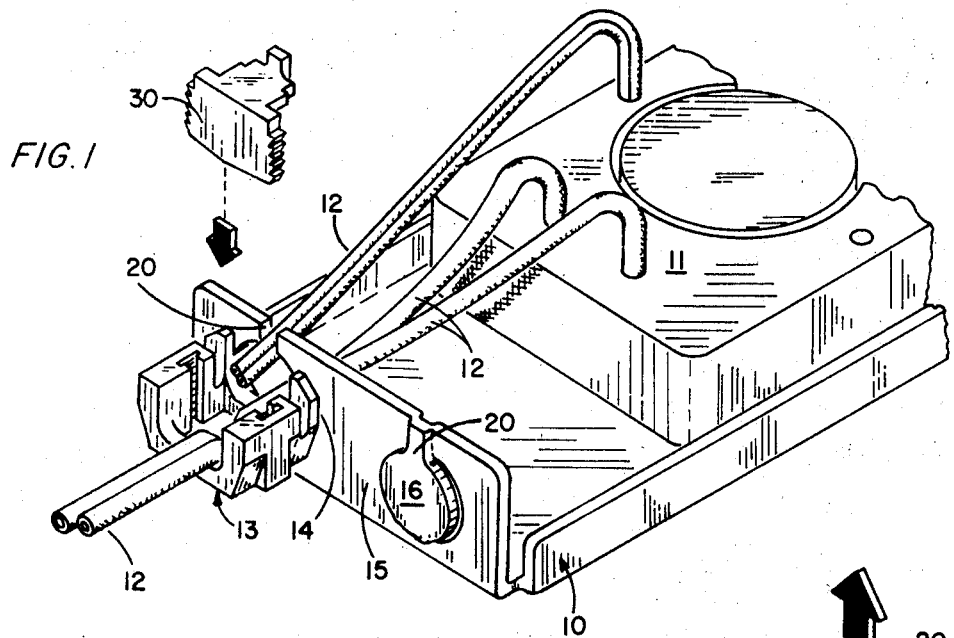
FIG. 1 is a schematic showing of a typical electrical box or control case wherein wires are fed through the bushing strain relief.

In FIG. 1, a control case or electrical box 10 contains a control device 11 to which electrical wires 12 are connected after passing through a bushing 13. Bushing 13 is placed into a hole or aperture 14 in the wall or side 15 of the box. Hole 14 is of a type similar to that shown at 16 having a slot 20 starting at the upper edge of wall 15 to provide an opening to hole 14.

Figure 2:
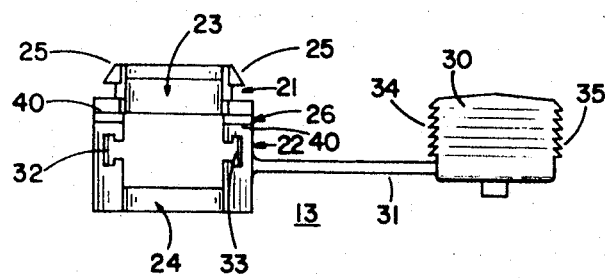
FIG. 2 is a top view of the bushing.

Referring to FIG. 2, bushing 13 is shown as may be commercially sold. The bushing has a first portion 21 and a second portion 22 connected by a connecting portion 26 so that the slots 23 and 24, running parallel to an axis of the portions, are aligned. Portion 21 has tab-like connection means 25; so that, when portion 21 is inserted into the hole 14 of wall 15, the bushing is locked in place. Portion 21 is actually deformed by squeezing the bushing to bring the open ends of slot 23 together to reduce the diameter of portion 21 so it passes into hole 14. Upon the ends springing back into position, tabs 25 retain the bushing in hole 14.

A plug member, retainer or retaining means 30, which can be attached to the main body of the bushing by a connection or tether 31 is received in grooves 32 and 33 on opposite sides of portion 22 to provide a gate-like retainer to hold a wire which has been previously placed in slots 23 and 24. The outer edges 34 and 35 of retainer 30 have pawl-like surfaces which cooperate with pawl-like surfaces of the grooves 32 and 33 to provide a locking means. When retainer 30 is pushed downward into portion 22 as shown in FIG. 1, the cooperating pawl-like surfaces lock the retaining means in place.

Figure 5:
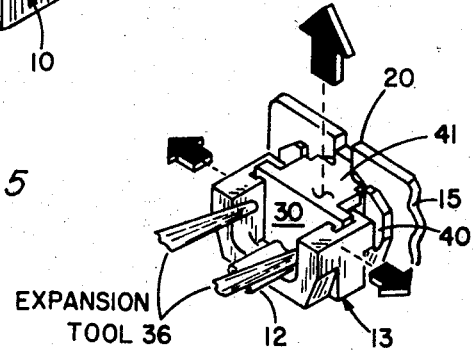
FIG. 5 is a view of the bushing of FIG. 1 with a tool for deforming the bushing to remove the retainer.

The bushing connecting portion 26 has a slot 40 on each side to only partially join portions 21 and 22 to allow movement of the rigid projecting ends of portion 22 should one wish to spread the ends apart to remove retainer 30 by an expanding pliers or tool 36 as shown in FIG. 5.

Figure 3:
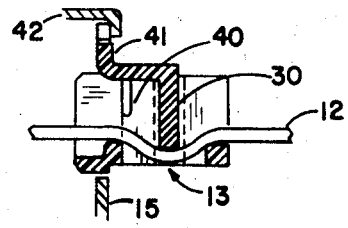
FIG. 3 is a side sectional view of the bushing of FIG. 1 shown in an electrical box with the projection on the retaining means in the slot of the box.

Referring to FIGS. 3 and 5, bushing 13 is shown in place in the wall 15 of a case. By means of a projection or tab 41 connected to the upper end of retainer 30, the open slot 20 is partially filled when the retainer is in the bushing. In addition, tab 41 locks the bushing to prevent rotation of the bushing in hole 14. When a cover 42 is placed on the electrical box, the slot 20 is completely filled to prevent access from outside of the electrical box through the slot.

Figure 4:
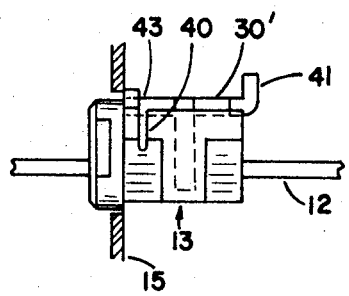
FIG. 4 is a showing of another use of the bushing wherein the slot in the box is covered by a cover and the retaining means is reversed in position.

In FIG. 4, another embodiment of the present invention is shown wherein the bushing 13 is placed into the hole 14 of wall 15. The retainer 30' is a T shape with tab 41 at one end. The retainer is reversed in position so that tab 41 is away from the wall of the case should the case not have a slot but only a hole 14. The other end 43 of retainer 30' covers the slot 23 in the bushing to not leave wires 12 exposed.

OPERATION OR USE OF THE INVENTION

When bushing 13 is used to wire an electrical device such as control 11 in FIG. 1, the bushing is placed in the hole 14 with first portion 21 projecting into the hole. Tabs 25 lock the bushing in place. Wires 12 are laid into the bushing by passing the wires down through slot 20 in the wall of the box and into the slots 23 and 24 of the bushing. The wires can be connected to the control 11 and positioned in a desired manner before placing the wires down through the slots into the bushing. Such an operation with heavy wires and rather cramped space around the control device is greatly helped by the fact that the wires need not be passed through the bushing and the hole in the wall as has been done with the prior art devices.

After the wires are in place in the bushing, retainer 30 is pushed into position against the wires to hold the wires solidly in place. The tab 41 of the plug member not only fills slot 20 in the wall of the box, but prevents the bushing from rotating to twist the wires.

After the operation is completed, any need to remove the wires from the bushing can be greatly expedited. Connection portion 26 of the bushing allows one to physically deform portion 22 of the bushing to move the sides outward by means of an expansion 36 tool as shown in FIG. 5. Retainer 30 is released from the locking means to allow removal of the retainer and wires.

The embodiments of the invention in which an exclusive property or right is claimed are defined as follows:

1. A bushing to protect and retain an electric wire passing through an aperture in a side of an electrical box comprising:
   a first body portion adapted to be received in an aperture of an electrical box, said first body portion having an open slot running parallel to its axis,
   a second body portion having an open slot running parallel to its axis,
   a connection portion having an open slot running parallel to its axis connecting said first and second body portions to align the axes and said slots of said first and second body portions and said connection portion whereby said aligned open slots are adapted to receive an electric wire after said first body portion is received in an aperture, and
   retaining means connected to only one of said body portions by fitting across its open slot, said retaining means being adapted to be placed in said one body portion after said first body portion is received in the aperture and being adapted to hold an electric wire in the aligned open slots of the bushing.

2. The invention if claim 1 wherein;
   said first body portion has means adapted to engage a portion of an outer periphery of the aperture when said first body portion is physically deformed by reducing its diameter to allow said first body portion to be placed into the aperture and thereafter said first body portion resiliently moves outward to engage the periphery of the aperture.

3. The invention of claim 2 wherein;
   said connection portion partially connects said first and second body portions whereby said second body portion can be physically deformed to remove said retaining means from the slot without changing the shape of said first body portion.

4. The invention of claim 1 wherein,
   said retaining means comprises: a plug member adapted to be received in an opening in said second body portion whereby said plug member is adapted to hold an electrical wire in said slot of said second body portion, and
   said connection portion partially connects said first and second body portions whereby said second body portion can be deformed without affecting said first body portion to remove said plug member.

5. The invention of claim 4 wherein;
   said second body portion is rigid enough to require a tool to be deformed to remove said plug member.

6. The invention of claim 1 wherein;
   said retaining means comprises a gate-like plug member adapted to be guided into a recess in said second body portion crosswise of its axis to hold the wire in said slot,
   said plug member and said recess having cooperating locking means on their contacting surfaces for holding said plug member in said recess, and
   said connection portion having a relief slot to provide only partial connection between said first and second body portions whereby said second body portion can be deformed to enlarge said recess to disengage said locking means to remove said plug member without affecting said first body portion and its adapted position in the aperture of the box.

7. A bushing to protect and retain an electrical wire passing through an aperture in a side of an electrical box wherein the side has an open slot connected to the aperture through which a wire can be passed to the aperture comprising:
   a first body portion adapted to be connected to an electrical box by being received into the aperture of the box, said first body portion having an open slot running parallel to its axis adapted to align with the slot of the box when said first portion is received by the aperture,
   a second body portion having an open slot running parallel to its axis,
   a connection portion having an open slot therein, said connection portion connecting said first and second body portions to align said open slots whereby said slots are adapted to receive an electric wire after said first body portion is received by the aperture, the wire being passed through said aligning open slots in the side of the box and said first, second and connection portions, and
   retaining means connected to one of said body portions by being received across its open slot after said first body portion is received by the aperture, said retaining means being adapted to hold the electric wire in said aligned open slots of the bushing.

8. The invention of claim 7 wherein;
   said retaining means comprises:
   a plug member cooperating with said one body portion,
   said plug member having a projection adapted to close the open slot in the side of the box.

9. The invention of claim 8 wherein;
   said second body portion has internal grooves on each side of its slot for receiving said plug member, and
   said outer edges of said plug member and a surface of each of said grooves have cooperating means for locking said plug member in place with sufficient force adapted to hold a wire in said open slots.

10. The invention of claim 9 wherein;
    said connection portion has relief slots to allow partial movement of said sides of said second body portion to disengage said means for locking said plug member when removal of said plug member is desired.

11. The invention of claim 1 wherein;
    said retaining means has means for locking said bushing to prevent its rotation when the bushing is placed in the aperture of the box.

12. The invention of claim 1 wherein;
    said retaining means provides a cover for said open slot of said one body portion to enclose the wire.

* * * * *